United States Patent [19]

Robertson

[11] Patent Number: 4,505,778

[45] Date of Patent: Mar. 19, 1985

[54] PAPER PRODUCTS SIZED WITH POLYISOCYANATE BLENDS

[75] Inventor: John R. Robertson, Glenn Mills, Pa.

[73] Assignee: ICI Americas Inc., Wilmington, Del.

[21] Appl. No.: 529,597

[22] Filed: Sep. 6, 1983

[51] Int. Cl.³ .............................................. D21H 1/10
[52] U.S. Cl. .................................... 162/135; 162/158; 162/164.6; 427/391; 427/395
[58] Field of Search ................. 162/158, 164.6, 168.2, 162/135; 428/537; 427/395, 391; 8/192

[56] References Cited

U.S. PATENT DOCUMENTS

| | | | |
|---|---|---|---|
| 3,084,092 | 4/1963 | Arlt | 162/158 |
| 3,346,445 | 10/1967 | Gay | 162/164.6 |
| 3,518,113 | 6/1970 | MacGugan | 162/164.6 |
| 3,826,769 | 7/1974 | Carlson | 162/164.6 |
| 4,096,127 | 6/1978 | Schurmann et al. | 428/537 |

FOREIGN PATENT DOCUMENTS 17598 10/1980 European Pat. Off. ......... 162/164.6

Primary Examiner—Peter Chin
Attorney, Agent, or Firm—Richard A. Rowe

[57] ABSTRACT

Cellulosic papers having improved handling and strength properties result when made by using as an internal or surface sizing an aromatic polyisocyanate/isocyanate terminated prepolymer blend.

11 Claims, No Drawings

PAPER PRODUCTS SIZED WITH POLYISOCYANATE BLENDS

This invention is directed to paper products having improved handling and strength made with polyisocyanate internal or surface sizing resins blends. In particular the invention is directed to hard-sized or slack-sized paper wherein a blend of polyisocyanate and polyisocyanate prepolymer is mixed with either the furnish or applied at the paper surface at the screen, the size press in the size tub or off the machine as a separate operation as calender size. Such treatments are carried out with aqueous emulsions containing the polyisocyanate and polyisocyanate prepolymer blend.

In the art of paper making cellulosic fibers derived from the chemical treatment of wood chips derived from aspen, hemlock, pine or spruce to form wood pulp in water suspension is laid down on fine screen to form a paper sheet. The cellulosic fiber dispersion usually contains other ingredients such as pigments, dyes, fillers, and sizing ingredients which is commonly referred to as furnish. When sizing ingredients are mixed with the furnish and formed into a sheet containing a relatively uniform distribution of fibers and sizing agent the process is termed internal sizing. Surface sizing on the other hand involves the application of sizing agent to the surface of the preformed paper. Surface sizing is usually done in a size tub, size press or on the calenders. However, surface sized papers generally contain an internal size as well.

Commonly used sizing agents in the paper industry include a wide range of material such as animal glue, rosin size, synthetic resins, casein, polyvinyl alcohol, starch, wax emulsions and many other similar substance. Synthetic resins such as dispersed polyethylenes, rosin-maleic anhydride condensation products, water dispersible melamine-formaldehyde resins, and area-formaldehyde resins have been described and are well-known to the art. The isocyanate resins of this invention are especially useful in replacing the formaldehyde resins as stiffening and reinforcing resins. In general the effect of a sizing ingredient is to control the permeability of paper to fluids either as gas or liquid and its wet strength. With synthetic resins sizes it is possible to increase the wet strength up to 50 percent and even more of the dry strength. Such synthetic resins can be used without adversely effecting the other properties of the paper. These improved properties are derived by forming resinous mechanical bonds between the cellulosic fibers, the fillers and other ingredients incorporated with furnish. Improvements are obtained through the application of this invention of polyisocyanate material wherein chemical urethane bonds are formed with the size by reactivity with the hydroxyl groups on the cellulosic fiberous material.

It is therefore an object of this invention to provide an improved paper product having a chemically bonded isocyanate size resins. It is another object to provide a process for making paper by incorporation therewith a polyisocyanate/polyisocyanate pre-polymer blend as a sizing ingredient.

These and other objects of the invention are accomplished by incorporating with the pulp or applying to the surface of the paper an emulsifiable polyisocyanate/prepolymer blend. Examples of organic isocyanate containing a plurality of isocyanate groups which may be present include aromatic isocyanates such as m- and p-phenylenediisocyanate, toluene-2,4- and 2,6-diisocyanates, diphenylmethane-4,4'diisocyanate, diphenylmethane-2,4-diisocyanate, chlorophenylene-2,4-diisocyanate, diphenylene-4,4'diisocyanate, 4,4'-diisocyanate-3,3'dimethyldiphenyl, 3-methyldiphenylmethane-4,4'-diisocyanate and diphenyletherdiisocyanate and 2,4,6-triisocyanatotoluene and 2,4,4'-triisocyanatodiphenylether. There may be present mixtures of isocyanates for example a mixture of toluene diisocyanate isomer such as the commercially available mixtures of 2,4- and 2,6-isomers and also the mixture of di and higher polyisocyanates produced by phosgenation of aniline/formaldehyde condensates. Such mixtures are well-known in the art and include the crude phosgenation products containing mixtures of methylene bridged polyphenylpolyisocyanates including diisocyanate, triisocyanate and higher polyisocyanates together with any phosgenation by-products.

Preferred compositions of the present invention are those wherein the isocyanate is an aromatic diisocyanate or polyisocyanate of higher functionality in particular crude mixtures of methylene bridged polyphenylpolyisocyanates containing diisocyanate, triisocyanate and higher functionality polyisocyanates. The methylene bridged polyphenylpolyisocyanates are well-known in the art and are sometimes referred to as polymeric methylene bridged polyphenyldiisocyanate (MDI) having an isocyanate functionality ranging from 2.5-3 and other products sometimes referred to as crude MDI having higher functionality. They are prepared by phosgenation of corresponding mixtures of polyamines obtained by condensation of aniline and formaldehyde.

The polyisocyanate/isocyanate prepolymer blend is made by incorporating with the above-described polyisocyanates from 1–10% and preferably from 3–5 percent by weight of a prepolymer formed by reacting monoalkyl ethers of polyalkylene glycols or polyester polyether glycols with polyisocyanate to form an —NCO terminated urethane adduct. Such blends are well-known to be emulsifiable in water wherein the prepolymer composition acts as a nonionic surface active agent for the unreacted polyisocyanate derivatives wherein their use is described as a bonding agent for polyurethane foam. Examples of this application are described in U.S. Pat. No. 3,996,154. The prepolymers have a general formula $RO(CH_2CHR'O)_nCONHX$ wherein R is an alkyl group of from 1 to 4 carbon atoms, R' is selected from H, $CH_3$ or $C_2H_5$, n is an integer such that the compound contains an average of at least 5 oxyalkylene groups and X is a residue of a di or polyisocyanate and contains at least one free isocyanate group. Examples of R include ethyl, propyl and butyl and is preferred to be methyl radical. There must be sufficient oxyalkylene groups $(CH_2CH_2O)$ present in the prepolymer such that there is at least an average of 5 such groups per molecule. It is preferred that n represents an average of from 5 to 120. R may also be a residue of a hydroxy or alkyl terminated polyester which is a condensation product of a diacid with a polyether glycol having a similar number of oxyalkylene groups. The free —NCO concentration in such isocyanate prepolymers may range from 5–25% by weight. Furthermore, the blend may be selected from blends of polyethers and polyesters having terminal isocyanate groups. The group X is a residue which would remain after one isocyanate group has been reacted to form a urethane link. The group X may be the residue of any diisocyanate or higher polyisocyanate and is preferred to be a residue of methylenediphenyldiisocyanate. However, X can be derived from the di and polyisocyanates listed above.

The prepolymers may be manufactured by reacting an alcohol of the formula RO(CH$_2$CHR'O)H with an isocyanate having at least two isocyanate groups there being used at least one molar portion of isocyanate for each molar portion of the hydroxy group on said polyether alcohol. It is preferred that R and R' be a methyl group and the molecular weight of the polyether alcohol be of a molecular weight ranging from 300–1000 and most preferably 500 and 750. These alcohols are commercially available and are made by reacting the appropriate alcohol with either ethylene oxide or propylene oxide, both of these in sequence or blends of the two in stoicheometric proportions to provide the preferred molecular weight range.

The polyisocyanate/polyisocyanate prepolymer blend may be made by adding the alcohol to isocyanate and allowing the reaction to proceed preferably by heating the reaction mixture to a temperature of 50°–150° C. Alternatively the reaction can be carried out at lower temperatures in the presence of a small amount of catalyst such as triethylenediamine. This prepolymer can be blended with a polyisocyanate liquid in appropriate amounts. Alternatively the appropriate amount can be added to all the polyisocyanate and thereafter heated to form the polyisocyanate/prepolymer blend in situ.

The preparation of the polyisocyanate/prepolymer blend can be better understood by reference to the following examples but not limited thereby. In the following examples all proportions refer to parts by weight unless otherwise specified.

Preparation A 600 parts of a monomethylether of polypropylene glycol average molecular weight 550 (Carbowax ®550) and 600 parts of monomethylether of polypropylene glycol having average molecular weight 750 (Carbowax ®750) heated at 100° C. where added with agitation to 38,800 parts of polymeric methylenediphenyldiisocyanate having an isocyanate content of 31.5 percent and a functionality of 2.7 isocyanate groups per molecule heated at 100° C. The blend was stirred for 30 minutes at 100° C. before cooling. The product contained a theoretical total of 4 percent by weight of prepolymer adduct.

Because of the high affinity for the polyisocyanate/isocyanate terminated prepolymer blend to react with cellulosic materials, the resin can be added as sizing material at the beater, the head box, at the wire, when applied internally or by means of a size press, a size tub or at the calendar when surface sizing or when applied at one or more of these locations in conventional paper making machines. The isocyanate size may be added directly to the aqueous pulp slurry when good agitation is supplied or as an aqueous oil-in-water emulsion when such procedure is more convenient. Substantial improvement is obtained when the size is applied in concentrations to provide a dry paper having incorporated therewith from 0.25–6 percent by weight based on the weight of the cellulosic fiber. The improvements offered by the paper sized with the polyisocyanate sizing material is demonstrated in the following example.

EXAMPLE 1

200 Grams of bleached cellulose pulp stock was beat with 650 grams of deionized water to form a pulp slurry. Into this was added 0.6 grams of a polyisocyanate/polyisocyanate prepolymer blend made according to Preparation A and thereafter agitated for a period of 1 minute to form a uniform resin emulsion. The treated pulp was then poured over a typical paper making screen held on an evacuated Buchner funnel. The wet paper sheet was then pressed on the screen for a period of 1 minute in a hydraulic press than cured at 80° C. for a period of 20 minutes. Most of the resin adhered to the pulp. The tensile strength of the sized paper after drying over a period of 24 hours at 25° C. was 442 psi. Untreated paper made under identical conditions had a tensile strength of 351 psi. The strength improvement is attributed the formation of chemical bonds between the resin and cellulose fibers.

EXAMPLE 2

According to the procedure outlined in Example 1 a wet paper containing no polyisocyanate size material is first made. Over the paper web is poured an aqueous solution containing about 2 percent by weight of the size material of Preparation A in proportions ranging from 0.25–6 percent by weight based on the weight of the pulp. The aqueous emulsion is drawn through the paper by evacuating the Bucher funnel and thereafter the paper web is dryed. The uptake of the isocyanate size which remains is normally less than about 5 percent by weight based on the cellulosic pulp. Paper made in this way can be expected to be improved in wet and dry strength similar to that experience in Example 1.

What is claimed is:

1. A paper composition comprising cellulosic fibers having chemically bonded polyisocyanate sizing resins consisting essentially of a blend of an aromatic polyisocyanate resin containing from 1–10 percent by weight of an isocyanate terminated prepolymer having the formula RO(CH$_2$CHR'O)$_n$CONHX wherein R is selected from an alkyl group containing 1 to 4 carbon atoms and a polyester condensation product of a diacid and a polyether glycol, R' is selected from H or CH$_3$, n is an integer ranging from 5 to 120 and X is a residue of an aromatic di or polyisocyanate and which contains at least one free isocyanate group.

2. A paper composition of claim 1 wherein said isocyanate blend has a free —NCO concentration ranging from 5–25% by weight.

3. A composition of claim 1 wherein said paper contains 0.25–6 percent by weight based on the weight of the cellulosic fibers of said resin.

4. A composition of claim 1 wherein said paper is made by a process wherein said polyisocyanate resin is added as an internal sizing agent.

5. A composition of claim 1 wherein said paper is made by a process wherein acid polyisocyanate resin is added as a surface sizing agent.

6. A composition of claim 1 wherein said paper is bonded by a polyisocyante consisting essentially of a blend of polymeric methylene diphenyldiisocyanate with a functionality of 2.7 isocyanate groups per molecule having reacted therewith 4% by weight of a blend of monomethyl ether of polypropylene glycol having an average molecular weight of 550 and a monomethyl ether of polypropylene glycol having an average molecular weight of 750.

7. A composition of claim 6 wherein said paper contains 0.25–6% by weight based on the weight of said cellulosic fibers of said resin.

8. A composition of claim 6 wherein said paper is made by a process wherein said polyisocyanate resin is added as an internal sizing agent.

9. A composition of claim 6 wherein said paper is made by a process wherein said polyisocyanate resin is added as a surface sizing agent.

10. In the process for making paper containing cellulosic fibers the improvement which comprises bonding said cellulosic fibers together with from 0.25–6% by weight based on the weight of said fibers of a polyisocyanate size resin consisting essentially of an aromatic polyisocyanate containing from 1–10% by weight of an isocyanate terminated prepolymer having the formula $RO(CH_2CHR'O)_nCONHX$ wherein R is selected from an alkyl group containing 1 to 4 carbon atoms and a polyester condensation product of a diacid and a polyether glycol, R' is selected from H or $CH_3$, n is an integer ranging from 5 to 120 and X is a residue of an aromatic di or polyisocyanate and which contains at least one free isocyanate group.

11. A process of claim 10 wherein said polyisocyanate size consists essentially of a blend of polymeric methylene diphenyldiisocyanate with a functionality of 2.7 isocyanate groups per molecule having reacted therewith 4% by weight of a blend of monomethyl ether of polypropylene glycol having an average molecular weight of 550 and a monomethyl ether of polypropylene glycol having an average molecular weight of 750.

* * * * *

UNITED STATES PATENT AND TRADEMARK OFFICE
CERTIFICATE OF CORRECTION

PATENT NO. : 4,505,778
DATED : March 19, 1985
INVENTOR(S) : John R. Robertson

It is certified that error appears in the above-identified patent and that said Letters Patent is hereby corrected as shown below:

In the specification, Column 3, line 38, delete "polypropylene" and insert ---polyethylene---; line 40, delete "polypropylene" and insert ---polyethylene---.

In Claim 6, line 6, delete "polypropylene" and insert ---polyethylene---.
In Claim 6, line 8, delete "polypropylene" and insert ---polyethylene---.
In Claim 11, line 6, delete "polypropylene" and insert ---polyethylene---.
In Claim 11, lines 7-8, delete "polypropylene" and insert ---polyethylene---.

Signed and Sealed this

Tenth Day of May, 1988

*Attest:*

DONALD J. QUIGG

*Attesting Officer*   *Commissioner of Patents and Trademarks*